(12) United States Patent
Katz

(10) Patent No.: US 8,770,563 B2
(45) Date of Patent: Jul. 8, 2014

(54) VACUUM HOLD-DOWN APPARATUS

(75) Inventor: Asher Katz, Tel Aviv (IL)

(73) Assignee: Orbotech Ltd., Yavne (IL)

( * ) Notice: Subject to any disclaimer, the term of this patent is extended or adjusted under 35 U.S.C. 154(b) by 527 days.

(21) Appl. No.: 13/007,009

(22) Filed: Jan. 14, 2011

(65) Prior Publication Data

US 2011/0175271 A1    Jul. 21, 2011

(30) Foreign Application Priority Data

Jan. 17, 2010 (IL) .......................... 203353

(51) Int. Cl.
*B25B 11/00* (2006.01)
*B23Q 3/00* (2006.01)
*B23P 17/00* (2006.01)

(52) U.S. Cl.
CPC .............. *B25B 11/00* (2013.01); *B25B 11/005* (2013.01); *B23Q 3/00* (2013.01); *B23P 17/00* (2013.01)
USPC ............................ 269/21; 269/20; 269/289 R

(58) Field of Classification Search
CPC .......... B25B 11/00; B23B 17/00; B23Q 3/00
USPC .................................. 269/21, 900, 20, 289 R
See application file for complete search history.

(56) References Cited

U.S. PATENT DOCUMENTS

| | | | |
|---|---|---|---|
| 3,910,621 A | 10/1975 | Hillier | |
| 4,301,999 A | 11/1981 | Higgins et al. | |
| 4,675,242 A | 6/1987 | Hashimoto et al. | |
| 5,048,804 A | 9/1991 | Ito | |
| 5,141,212 A * | 8/1992 | Beeding | 269/21 |
| 5,374,021 A | 12/1994 | Kleinman | |
| 5,671,910 A | 9/1997 | Davies et al. | |
| 5,709,023 A | 1/1998 | Lallement | |
| 6,182,956 B1 | 2/2001 | McMillan | |
| 6,371,430 B1 | 4/2002 | Vernackt | |
| 6,422,548 B1 | 7/2002 | Baber et al. | |
| 6,499,506 B2 | 12/2002 | Feiner | |
| 6,889,967 B2 * | 5/2005 | Brown | 269/21 |
| 7,259,777 B2 | 8/2007 | Retschke et al. | |
| 7,469,886 B2 | 12/2008 | Shen et al. | |
| 7,578,629 B2 | 8/2009 | Kruijt | |
| 2002/0139424 A1 | 10/2002 | Feiner | |
| 2004/0061267 A1 | 4/2004 | Brown | |

FOREIGN PATENT DOCUMENTS

JP    2009-28888 A    2/2009

* cited by examiner

*Primary Examiner* — Lee D Wilson
*Assistant Examiner* — Seahee Yoon
(74) *Attorney, Agent, or Firm* — Sughrue Mion, PLLC

(57) ABSTRACT

A vacuum hold-down system for use with workpieces of various shapes and/or sizes is disclosed. The system comprising a vacuum hold-down table defining a mask support plane and an apertured vacuum table mask which is selectably positionable on said mask support plane, wherein said vacuum hold-down table and said vacuum table mask is configured to define a plurality of selectable different contiguous arrays of vacuum apertures, by suitable relative positioning of said vacuum table mask and said vacuum hold-down table in said mask support plane.

30 Claims, 15 Drawing Sheets

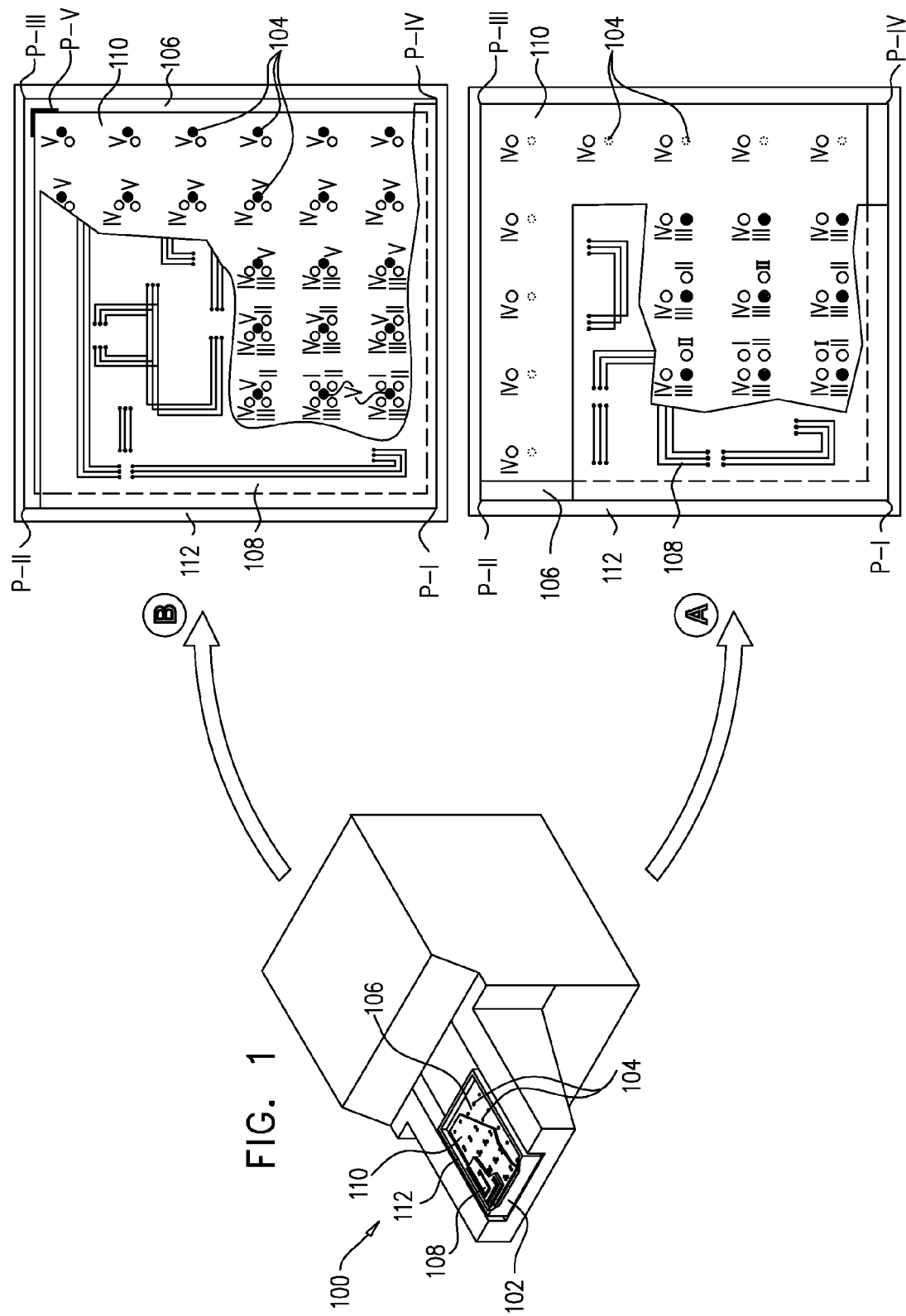

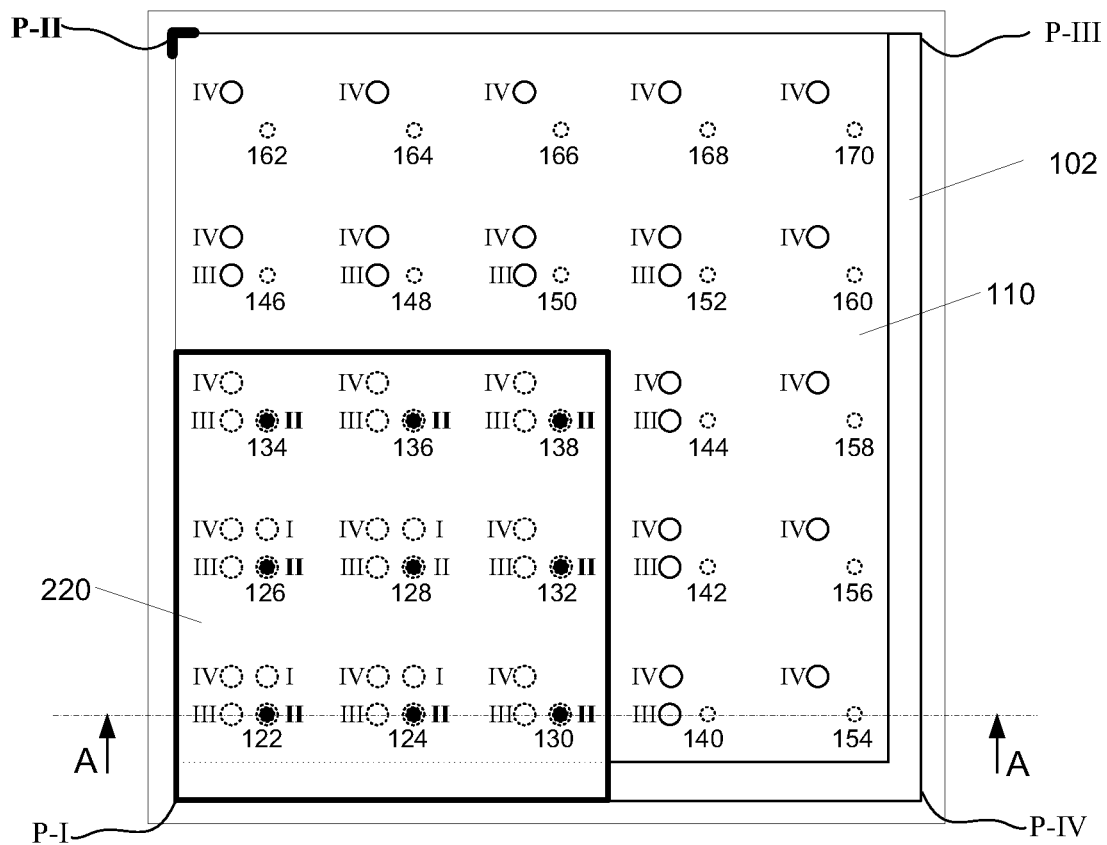
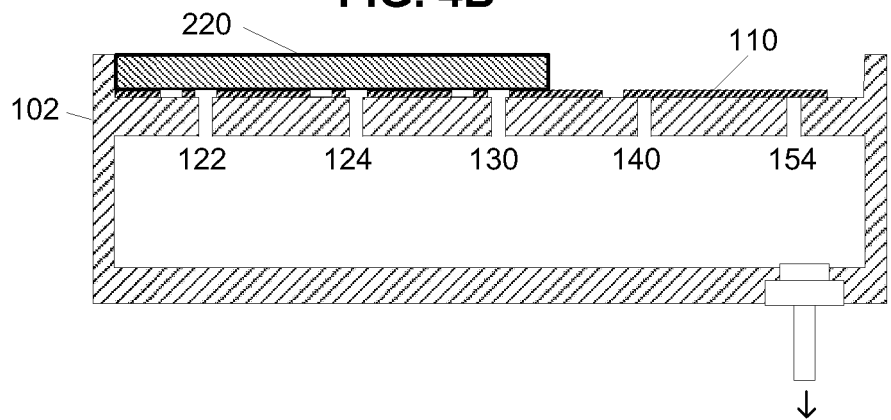

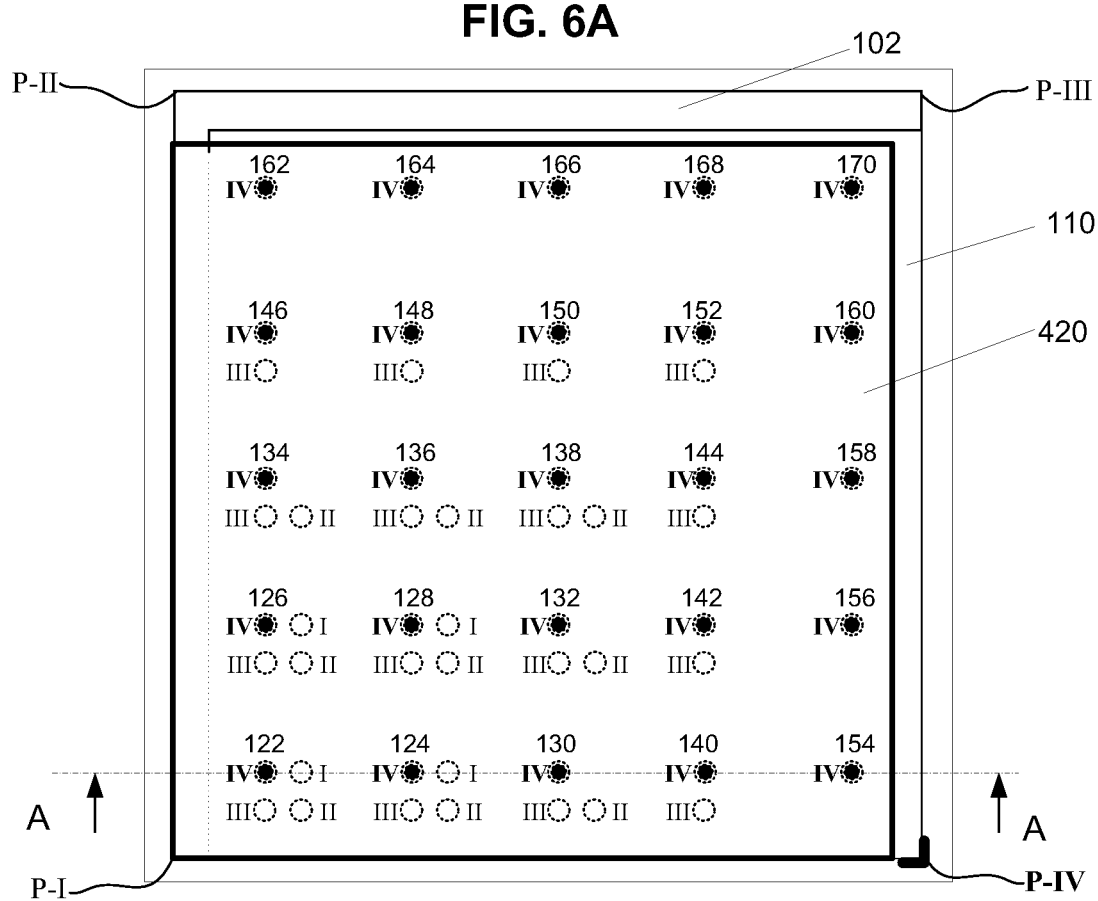
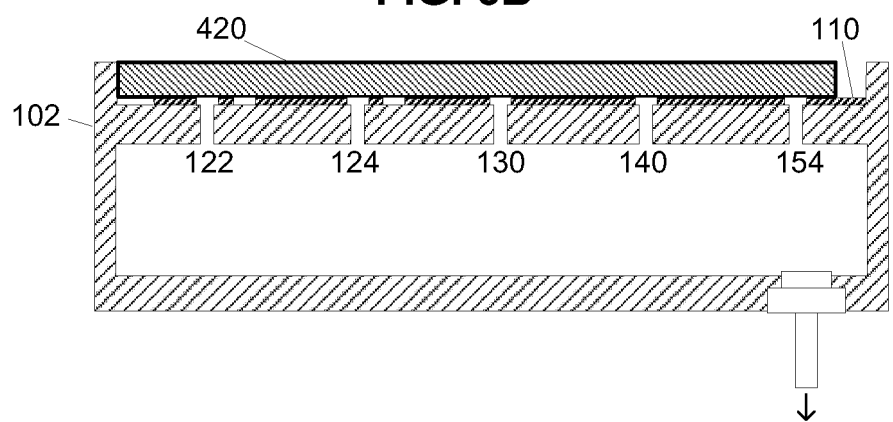

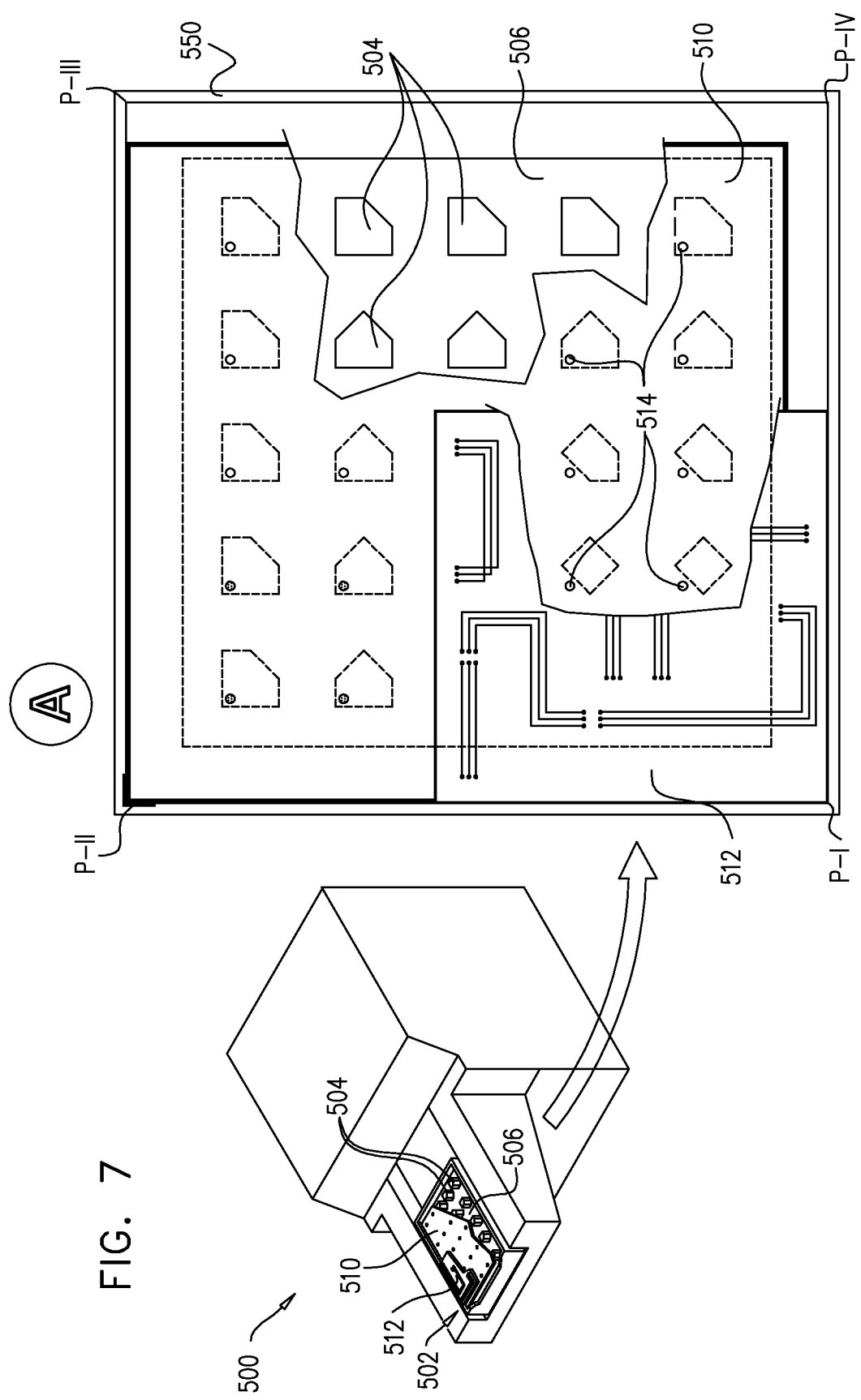

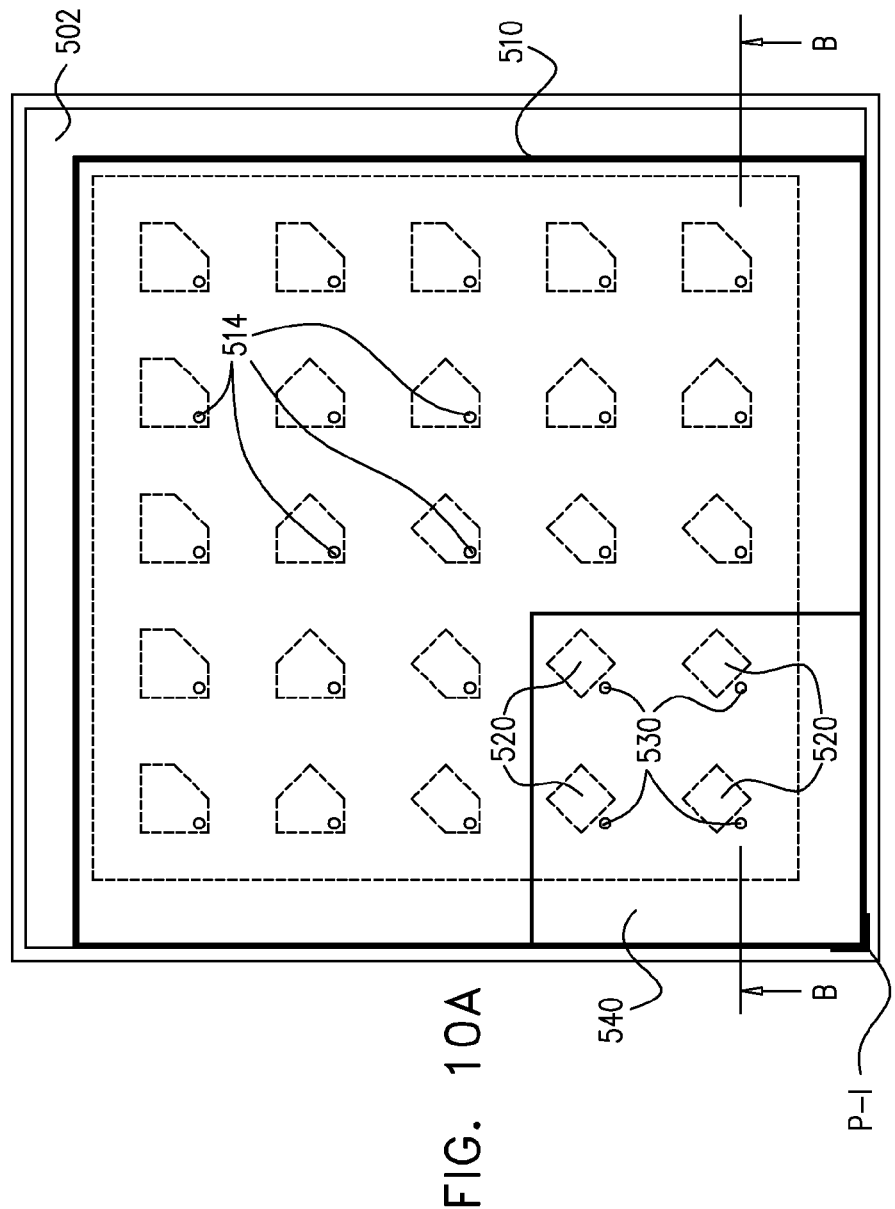
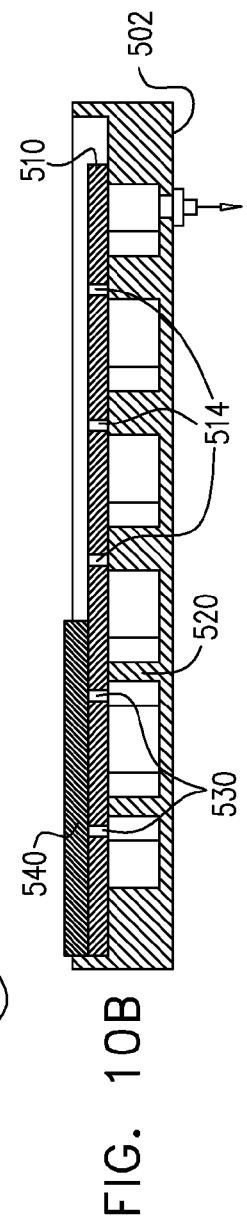
FIG. 10A
FIG. 10B

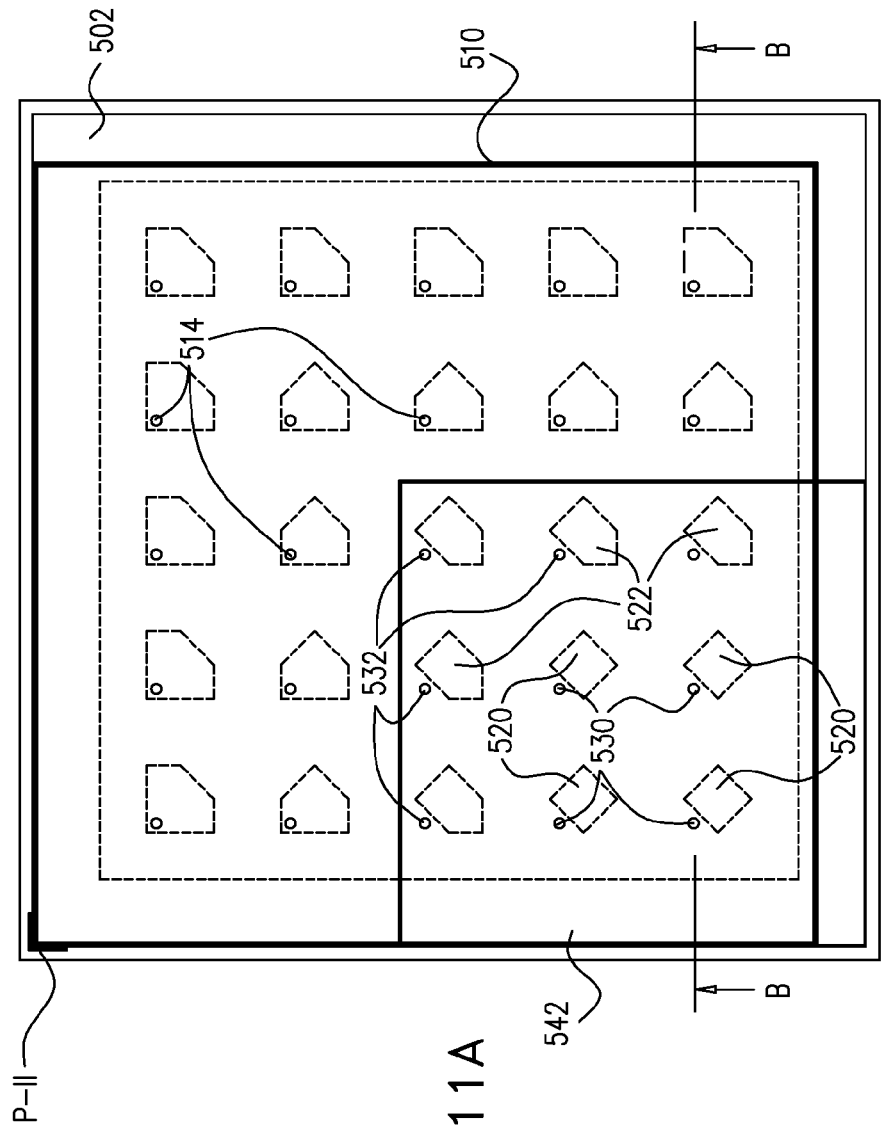
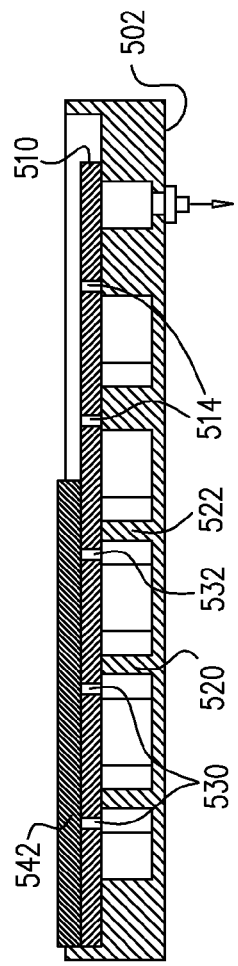
FIG. 11A
FIG. 11B

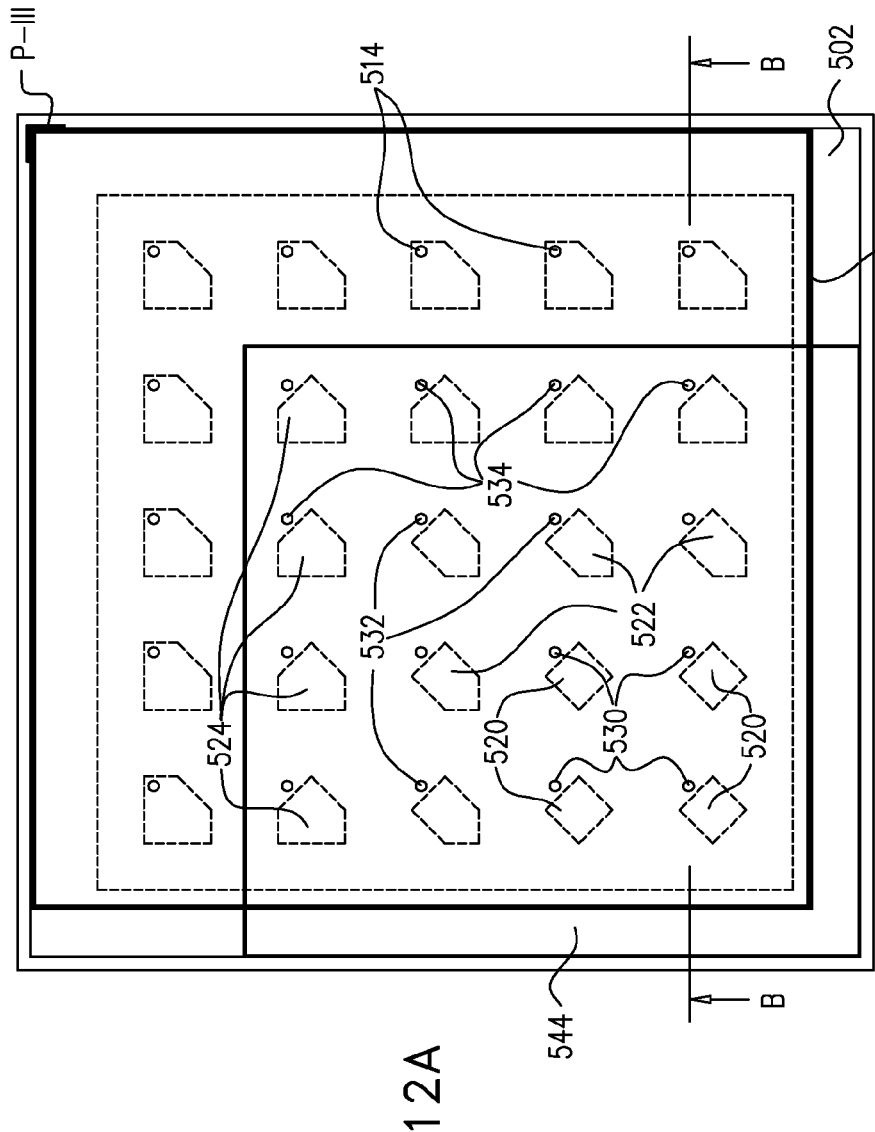
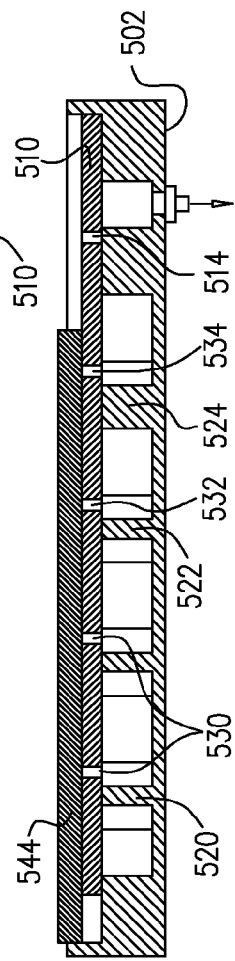
FIG. 12A
FIG. 12B

VACUUM HOLD-DOWN APPARATUS

CROSS-REFERENCES TO RELATED APPLICATIONS

The present application claims benefit of Israeli patent application number 203353, filed Jan. 17, 2010, entitled "VACUUM HOLD-DOWN APPARATUS" the content of which is incorporated herein by reference in its entirety.

FIELD OF THE INVENTION

The present invention relates to vacuum hold-down apparatus generally and more specifically to inspection systems employing vacuum hold-down apparatus.

BACKGROUND OF THE INVENTION

The following U.S. patents are believed to represent the current state of the art: U.S. Pat. Nos. 5,671,910, and 5,709,023, 6,422,548 and 7,469,886.

SUMMARY OF THE INVENTION

The present invention seeks to provide a vacuum hold-down apparatus.

There is thus provided in accordance with a preferred embodiment of the present invention a vacuum hold-down system for use with workpieces of various shapes and/or sizes, the system including a vacuum hold-down table defining a mask support plane and an apertured vacuum table mask which is selectably positionable on the mask support plane, the vacuum hold-down table and the vacuum table mask being configured to define a plurality of selectable different contiguous arrays of vacuum apertures, by suitable relative positioning of the vacuum table mask and the vacuum hold-down table in the mask support plane.

In accordance with a preferred embodiment of the present invention, the vacuum hold-down table has an array of vacuum orifices arranged on a support surface thereof and the vacuum table mask has formed thereon at least two arrays of apertures, mutually offset from each other, each of the at least two arrays of apertures being registrable with at least some vacuum orifices of the array of vacuum orifices, each aperture of each of the at least two arrays of apertures being configured to underlie at least one of the workpieces.

In accordance with a preferred embodiment of the present invention, the vacuum table mask has an array of apertures arranged on a support surface thereof, the mask being configured to underlie at least one of the workpieces and the vacuum hold-down table has formed thereon at least two arrays of vacuum orifices, mutually offset from each other, at least some of the apertures of the mask being registrable with orifices of each of the at least two arrays of orifices.

There is also provided in accordance with a preferred embodiment of the present invention a vacuum hold-down system for use with workpieces of various shapes and/or sizes, the system including a vacuum hold-down table having an array of vacuum orifices arranged on a support surface thereof, and a vacuum table mask having formed thereon at least two arrays of apertures, mutually offset from each other, each of the at least two arrays of apertures being registrable with at least some vacuum orifices of the array of vacuum orifices, each aperture of each of the at least two arrays of apertures being configured to underlie at least one of the workpieces.

There is further provided in accordance with yet another preferred embodiment of the present invention a vacuum hold-down system for use with workpieces of various shapes and/or sizes, the system including a vacuum table mask having an array of apertures arranged on a support surface thereof, the mask being configured to underlie at least one of the workpieces, and a vacuum hold-down table having formed thereon at least two arrays of vacuum orifices, mutually offset from each other, at least some of the apertures of the mask being registrable with orifices of each of the at least two arrays of orifices.

Preferably, the cross-sectional size of each aperture is at least slightly larger than the cross-sectional size of each vacuum orifice.

Preferably, the vacuum table mask is located over the vacuum hold-down table. Alternatively, the vacuum table mask is located inside the plenum of the vacuum hold-down table.

In accordance with a preferred embodiment of the present invention areas of the at least two arrays are at least partially overlapping.

In accordance with a preferred embodiment of the present invention, the vacuum hold-down table has an array of support surfaces arranged thereon and the vacuum table mask has formed thereon an array of apertures.

In accordance with a preferred embodiment of the present invention, the vacuum table mask has an array of apertures, the mask being configured to underlie at least one of the workpieces and the vacuum hold-down table has formed thereon at least two arrays of support surfaces, support surfaces of different arrays of the at least two arrays having a different cross sectional configuration, support surfaces of each array of the at least two arrays having the same cross sectional configuration, the apertures of the mask being configured so as not to overlie support surfaces of at least one of the at least two arrays of support surfaces.

Preferably, the vacuum table mask is located over the support surfaces.

Preferably, the vacuum table mask is positionable at least two selectable locations relative to the vacuum hold-down table. Additionally or alternatively, the vacuum table mask includes four arrays of apertures.

In accordance with a preferred embodiment of the present invention the vacuum table mask is positionable at four selectable locations relative to the vacuum hold-down table. Additionally, the four selectable locations are defined by corners of the vacuum hold-down table.

There is even further provided in accordance with still another preferred embodiment of the present invention a vacuum table mask for use with a vacuum hold-down table having an array of vacuum orifices arranged on a support surface thereof and workpieces of various shapes and/or sizes, the mask including a substrate having formed thereon at least two arrays of apertures, mutually offset from each other, each of the at least two arrays of apertures being registrable with at least some vacuum orifices of the array of vacuum orifices.

In accordance with a preferred embodiment of the present invention the cross-sectional size of each aperture of the at least two arrays of apertures is at least slightly larger than the cross-sectional size of each vacuum orifice of the array of vacuum orifices.

Additionally or alternatively, the vacuum table mask includes four arrays of apertures. Additionally or alternatively, areas of the at least two arrays are at least partially overlapping.

There is also provided in accordance with yet another preferred embodiment of the present invention a method for providing vacuum hold-down of workpieces of various shapes and/or sizes onto a vacuum hold-down table having an array of vacuum orifices arranged on a support surface thereof, the method including placing onto the support surface of the vacuum hold-down table, a vacuum table mask having formed thereon at least two arrays of apertures, mutually offset from each other, each of the at least two arrays of apertures being registrable with at least some vacuum orifices of the array of vacuum orifices, each of the at least two arrays of apertures being configured to underlie one of the workpieces, positioning the mask on the support surface such that one of the at least two arrays of apertures is in registration with at least some vacuum orifices of the array of vacuum orifices and placing a workpiece of a first size/shape of the workpieces of various shapes and/or sizes onto the vacuum hold-down table, overlying at least part of the mask and overlying the one of the at least two arrays of apertures which is in registration with at least some vacuum orifices of the array of vacuum orifices.

Preferably, the method also includes removing the workpiece of a first size/shape from the vacuum hold-down table, repositioning the mask on the support surface such that another one of the at least two arrays of apertures is in registration with at least some vacuum orifices of the array of vacuum orifices and placing one of the workpieces of a second size/shape onto the vacuum hold-down table, overlying at least part of the mask and overlying the another one of the at least two arrays of apertures which is in registration with at least some vacuum orifices of the array of vacuum orifices.

Additionally, areas of the at least two arrays are at least partially overlapping.

BRIEF DESCRIPTION OF THE DRAWINGS

The present invention will be understood and appreciated from the following detailed description, taken in conjunction with the drawings in which:

FIG. 1 is a simplified pictorial illustration of an inspection system employing vacuum hold-down apparatus constructed and operative in accordance with various embodiments of the present invention;

FIGS. 4A and 4B are respective plan and sectional illustrations of a second planar workpiece of a second size retained on the vacuum hold-down apparatus of an embodiment of the present invention in a second mutual registration arrangement, FIG. 4B being taken along the lines A-A in FIG. 4A;

FIGS. 6A and 6B are respective plan and sectional illustrations of a fourth planar workpiece of a fourth size retained on the vacuum hold-down apparatus of an embodiment of the present invention in a fourth mutual registration arrangement, FIG. 6B being taken along the lines A-A in FIG. 6A;

FIG. 7 is a simplified pictorial illustration of an inspection system employing vacuum hold-down apparatus constructed and operative in accordance with an embodiment of the present invention;

FIGS. 10A and 10B are respective plan and sectional illustrations of a first planar workpiece of a first size retained on the vacuum hold-down apparatus of FIGS. 7-9 in a first mutual registration arrangement, FIG. 10B being taken along the lines B-B in FIG. 10A;

FIGS. 11A and 11B are respective plan and sectional illustrations of a second planar workpiece of a second size retained on the vacuum hold-down apparatus of FIGS. 7-9 in a second mutual registration arrangement, FIG. 11B being taken along the lines B-B in FIG. 11A;

FIGS. 12A and 12B are respective plan and sectional illustrations of a third planar workpiece of a third size retained on the vacuum hold-down apparatus of FIGS. 7-9 in a third mutual registration arrangement, FIG. 12B being taken along the lines B-B in FIG. 12A.

DETAILED DESCRIPTION OF A PREFERRED EMBODIMENT

Figure 2A:
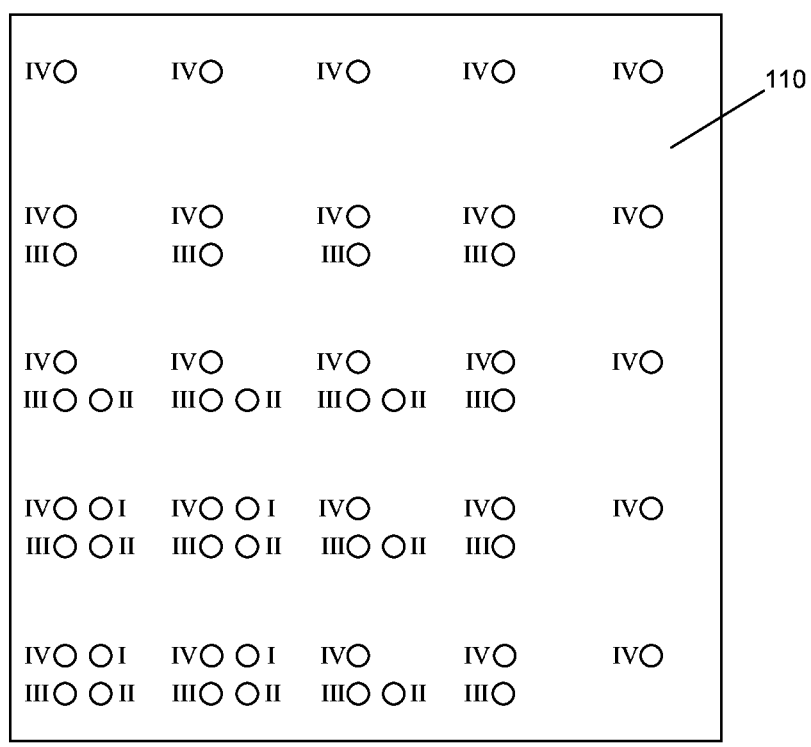
FIG. 2A is a simplified plan view illustration of a typical vacuum table mask useful in the vacuum hold-down apparatus of the present invention and having formed thereon multiple arrays of apertures, mutually offset from each other.
Figure 2B:
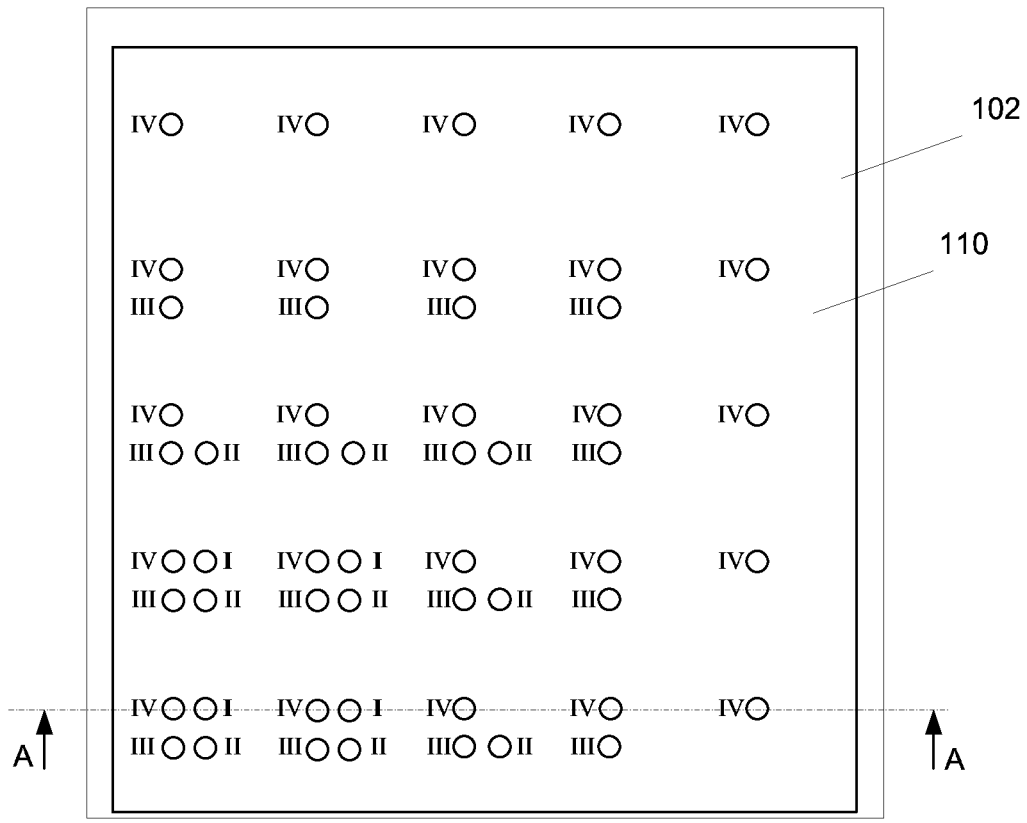
FIG. 2B is a simplified plan view illustration of a support surface of a vacuum hold-down table according to an exemplary embodiment.
Figure 2C:
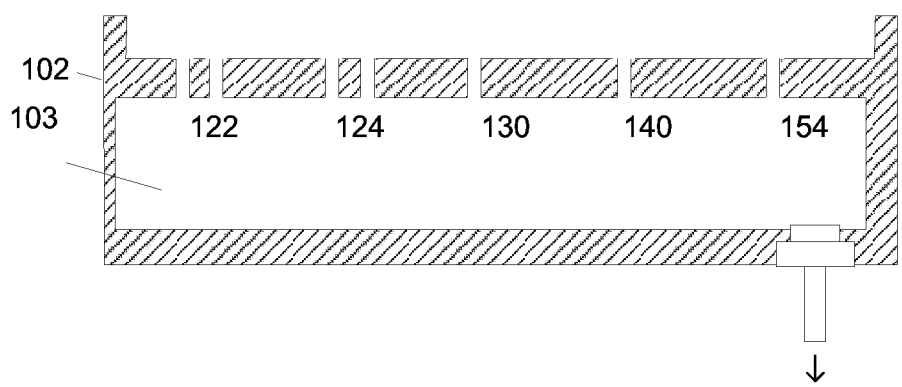
FIG. 2C is a sectional illustration of the hold-down table of FIG. 2B.

Reference is now made to FIG. 1, which is a simplified pictorial illustration of an inspection system employing vacuum hold-down apparatus constructed and operative in accordance with a preferred embodiment of the present invention.

As seen in FIG. 1, there is provided an inspection system 100, such as an optical inspection system, for example an Orbotech Discovery™ 8000 AOI System, commercially available from Orbotech Ltd., of Yavne, Israel. Inspection system 100 includes a vacuum hold-down table 102 having an array of vacuum orifices 104, arranged on a support surface 106 thereof and which is operative to retain workpieces, such as a planar workpiece 108, during optical inspection thereof.

The term "vacuum orifice" is used throughout in a sense which is somewhat broader than conventional usage. When referring to a vacuum hold-down table such that that in the Orbotech Discovery™ 8000 AOI System, the holes formed in a planar table surface are vacuum orifices. When referring to a vacuum hold-down table of the type shown in FIGS. 15 & 16 of U.S. Pat. No. 7,259,777, here termed a "topless vacuum hold-down table", all of the non-raised portions of the table are considered to be vacuum orifices.

In accordance with a preferred embodiment of the present invention, the vacuum hold-down apparatus includes, in addition to the vacuum hold-down table 102, a vacuum table mask 110 having formed thereon at least two arrays of apertures, the apertures of the at least two arrays being mutually offset from each other and each of the at least two arrays of apertures being registrable with at least some vacuum orifices 104. Preferably, the cross-sectional size of the apertures is at least slightly larger than the cross-sectional size of the vacuum orifices 104. Optionally the cross sectional configuration of the apertures of the mask may be different on opposite planar surfaces of the mask. For example, the area of the apertures may be relatively larger on the surface of the mask which faces the workpiece and relatively smaller on the surface of the mask which faces the vacuum hold-down table.

It is a particular feature of the operation of the present invention that:

when it is sought to inspect a workpiece of a first size, the mask 110 is placed at a first location relative to vacuum hold-down table 102 such that the apertures of a first array are in registration with some of the vacuum orifices 104 of the vacuum hold-down table 102, all of the apertures of the first array underlie the workpiece of a first size, and the remaining vacuum orifices 104 are blocked by mask 110, such that free flow of air through all of vacuum orifices 104 is prevented; and when it is sought to inspect a workpiece of a second size, the mask 110 is placed at a second location relative to vacuum hold-down table 102, different from the first location, such that the apertures of a second array are in registration with some of the vacuum orifices 104 of the vacuum hold-down table 102, all of the apertures of the second array underlie the workpiece of a second size, and the remaining vacuum orifices 104 are blocked by mask 110, such that free flow of air through all of vacuum orifices 104 is prevented.

Enlargement A of FIG. 1 shows an embodiment wherein mask 110 includes four arrays of apertures and the mask is positionable at four selectable locations relative to vacuum hold-down table 102. The arrays are designated I, II, III and IV and the apertures belonging to each array are so identified. The four selectable locations are defined by the four corners of peripheral walls 112 of vacuum hold-down table 102, which corners are designated as mask placement designators P-I, P-II, P-III and P-IV. By positioning a given corner of the mask 110 in engagement with a given corner designated as mask placement designator P-I, P-II, P-III or P-IV, the apertures of a corresponding array I, II, III or IV are placed in registration with appropriate ones of orifices 104 of vacuum hold-down table 102, as indicated by solid black dots.

Enlargement B of FIG. 1 shows an embodiment wherein mask 110 includes five arrays of apertures and the mask is positionable at five selectable locations relative to vacuum hold-down table 102. The arrays are designated I, II, III, IV and V and the apertures belonging to each array are so identified. The five selectable locations are defined by the four corners identified as mask placement designators P-I, P-II, P-III, P-IV of peripheral walls 112 of vacuum hold-down table 102 and by a mask placement designator P-V. By positioning a given portion of the mask 110 at a given location indicated by any of mask placement designators P-I, P-II, P-III, P-IV and P-V, the apertures of a corresponding array I, II, III, IV or V are placed in registration with appropriate ones of orifices 104 of vacuum hold-down table 102 as indicated by solid black dots.

Reference is now additionally made to FIG. 2A, which is a simplified plan view illustration of a typical vacuum table mask 110 useful in the vacuum hold-down apparatus of the present invention and having formed thereon multiple arrays of apertures, mutually offset from each other. FIG. 2A includes four arrays of apertures, which are mutually offset from each other. It is appreciated that alternative configurations of a vacuum table mask may include a greater or lesser number of apertures arranged in any suitable arrangement.

A first array of apertures is suitable for the smallest workpiece and includes four apertures, each designated I.

A second array of apertures is suitable for the next-smallest workpiece and includes nine apertures, each designated II.

A third array of apertures is suitable for the smallest workpiece and includes sixteen apertures, each designated III.

A fourth array of apertures is suitable for the smallest workpiece and includes twenty five apertures, each designated IV.

It is noted that the apertures of each array are mutually spaced by a spacing identical to the mutual spacing of the vacuum orifices 104.

It is also noted that apertures II are offset from corresponding apertures I by a distance equal to the distance by which mask 110 is shifted from mask placement designator P-I to mask placement designator P-II in the direction in which mask 110 is shifted from mask placement designator P-I to mask placement designator P-II.

It is further noted that apertures III are offset from corresponding apertures I by a first distance equal to the distance in which mask 110 is shifted from mask placement designator P-I to mask placement designator P-III in a first direction and by a second distance equal to the distance in which mask 110 is shifted from mask placement designator P-I to mask placement designator P-III in a second direction perpendicular to the first direction.

It is additionally noted that apertures IV are offset from corresponding apertures III by a distance equal to the distance in which mask 110 is shifted from mask placement designator P-III to mask placement designator P-IV in the direction in which mask 110 is shifted from mask placement designator P-III to mask placement designator P-IV.

As described above the relative offset and spacing of the apertures I, II, III and IV corresponds to the operational positions of the mask 110 relative to the vacuum hold-down table 102 for vacuum-efficient hold down and inspection of workpieces of four different sizes corresponding to the four arrays of apertures.

Figure 3A:
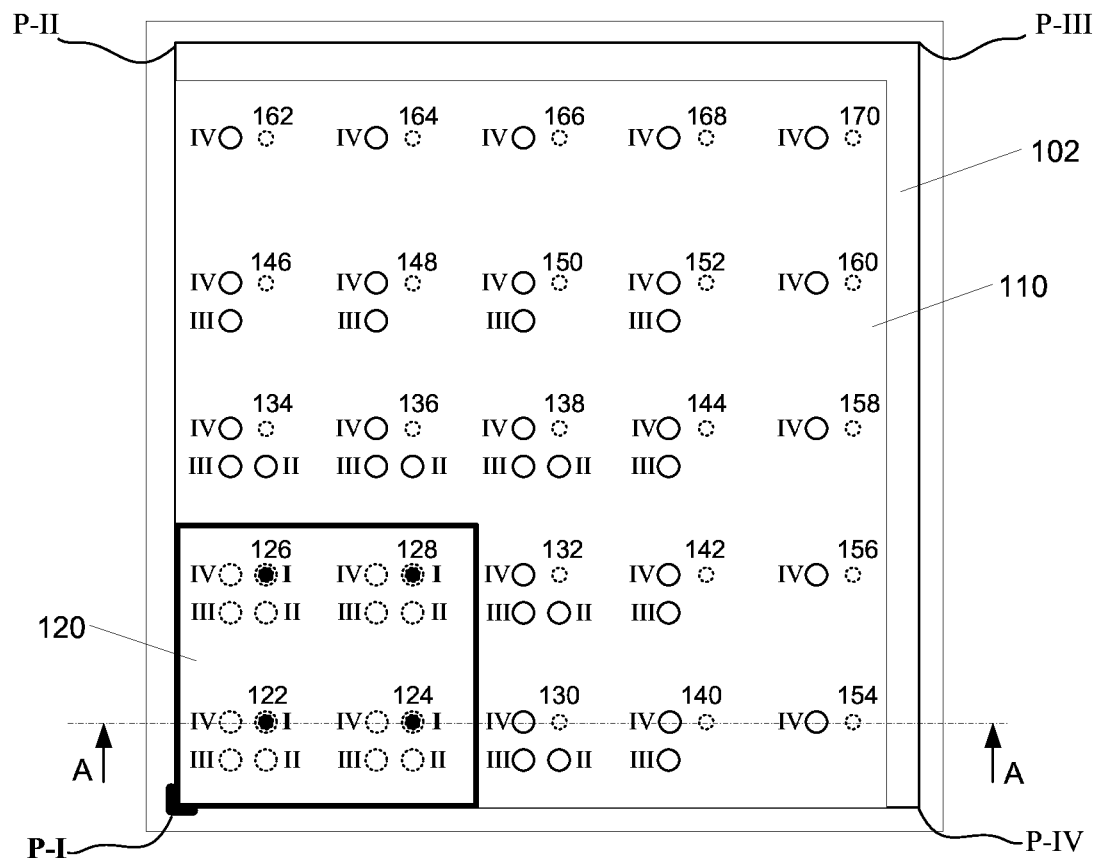
FIGS. 3A and 3B are respective plan and sectional illustrations of a first planar workpiece of a first size retained on the vacuum hold-down apparatus of an embodiment of the present invention in a first mutual registration arrangement, FIG. 3B being taken along the lines A-A in FIG. 3A.
Figure 3B:
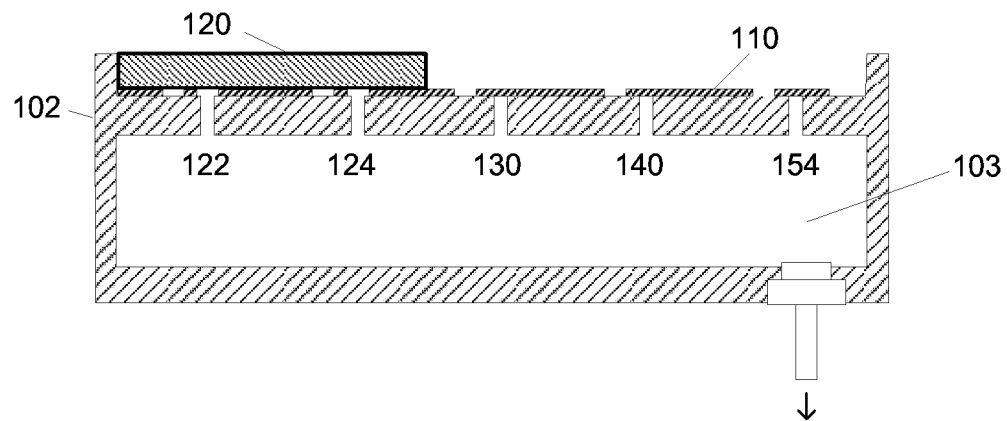

Reference is now made to FIGS. 3A and 3B, which are respective plan and sectional illustrations of a first planar workpiece 120 of a first size retained on vacuum hold-down apparatus of the present invention in a first mutual registration arrangement. The sectional illustration of FIG. 3B is taken along the line A-A in FIG. 3A As seen in FIGS. 3A and 3B, the mask 110 is positioned on the vacuum hold-down table 102 at a first position defined by mask placement designator P-I such that apertures I of the first array of apertures overlie corresponding vacuum orifices 122, 124, 126 and 128. The remaining vacuum orifices, designated by reference numerals 130, 132, 134, 136, 138, 140, 142, 144, 146, 148, 150, 152, 154, 156, 158, 160, 162, 164, 166, 168 and 170 are blocked by mask 110.

Reference is now made to FIGS. 4A and 4B, which are respective plan and sectional illustrations of a second planar workpiece 220 of a second size retained on vacuum hold-down apparatus of the present invention in a second mutual registration arrangement. The sectional illustration of FIG. 4B is taken along the line A-A in FIG. 4A As seen in FIGS. 4A and 4B, the mask 110 is positioned on the vacuum hold-down table 102 at a second position defined by mask placement designator P-II such that apertures II of the second array of apertures overlie corresponding vacuum orifices 122, 124, 126, 128, 130, 132, 134, 136 and 138. The remaining vacuum orifices, designated by reference numerals 140, 142, 144, 146, 148, 150, 152, 154, 156, 158, 160, 162, 164, 166, 168 and 170, are blocked by mask 110.

Figure 5A:
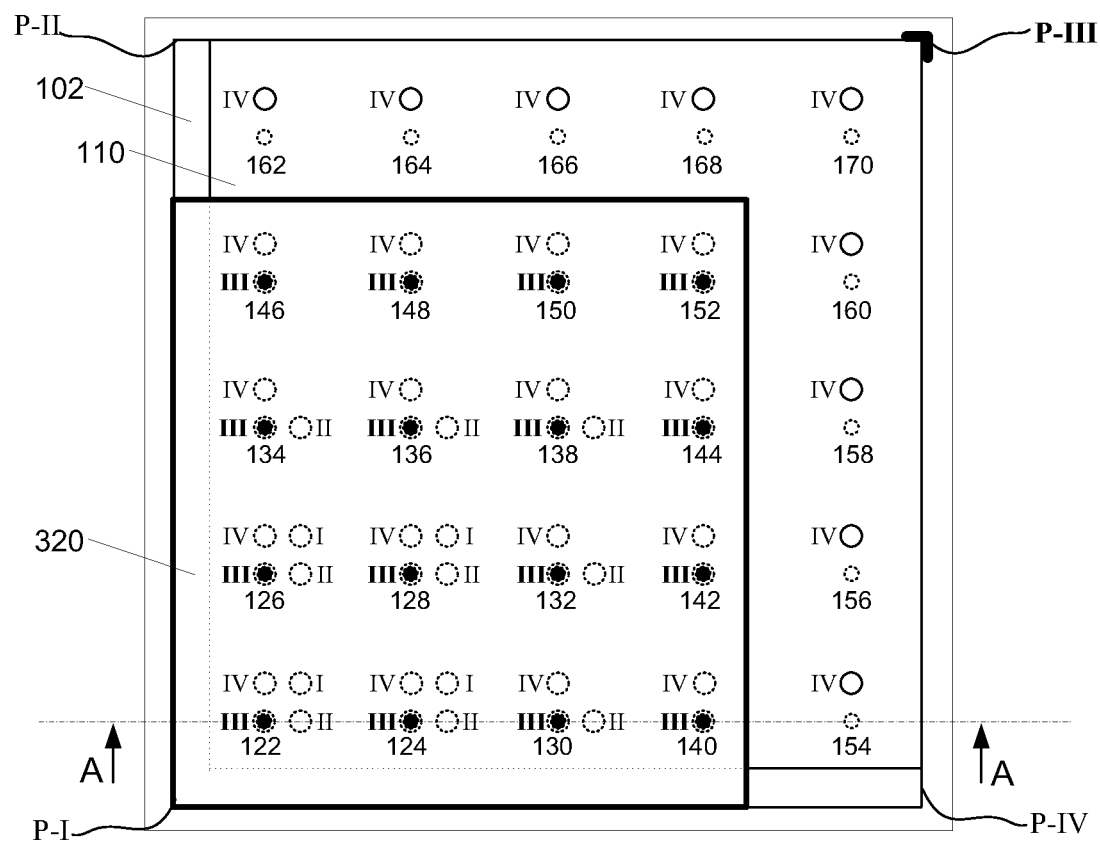
FIGS. 5A and 5B are respective plan and sectional illustrations of a third planar workpiece of a third size retained on the vacuum hold-down apparatus of an embodiment of the present invention in a third mutual registration arrangement, FIG. 5B being taken along the lines A-A in FIG. 5A.
Figure 5B:
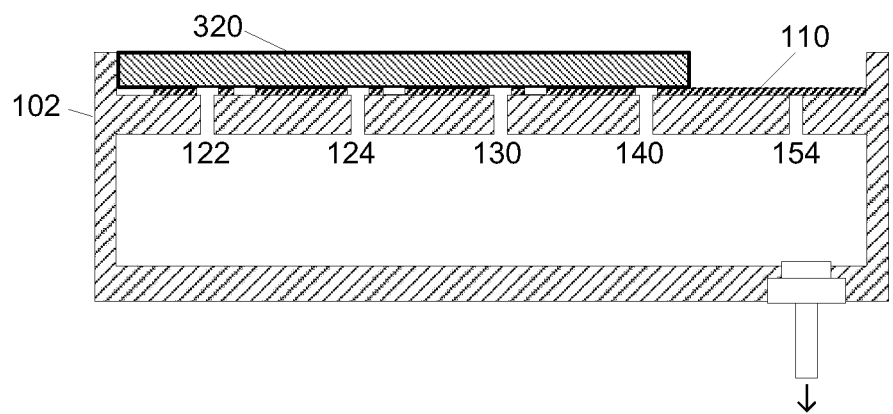

Reference is now made to FIGS. 5A and 5B, which are respective plan and sectional illustrations of a third planar workpiece 320 of a third size retained on vacuum hold-down apparatus of the present invention in a third mutual registration arrangement. The sectional illustration of FIG. 5B is taken along the line A-A in FIG. 5A. As seen in FIGS. 5A and 5B, the mask 110 is positioned on the vacuum hold-down table 102 at a third position defined by mask placement designator P-III such that apertures III of the third array of apertures overlie corresponding vacuum orifices 122, 124, 126, 128, 130, 132, 134, 136, 138, 140, 142, 144, 146, 148, 150 and 152. The remaining vacuum orifices, designated by reference numerals, 154, 156, 158, 160, 162, 164, 166, 168 and 170, are blocked by mask 110.

Reference is now made to FIGS. 6A and 6B, which are respective plan and sectional illustrations of a fourth planar workpiece 420 of a fourth size retained on vacuum hold-down apparatus of the present invention in a fourth mutual registration arrangement. The sectional illustration of FIG. 6B is taken along the line A-A in FIG. 6A. As seen in FIGS. 6A and 6B, the mask 110 is positioned on the vacuum hold-down table 102 at a fourth position defined by mask placement designator P-IV such that apertures IV of the fourth array of apertures overlie corresponding vacuum orifices 122, 124, 126, 128, 130, 132, 134, 136, 138, 140, 142, 144, 146, 148, 150, 152, 154, 156, 158, 160, 162, 164, 166, 168 and 170.

Figure 14:
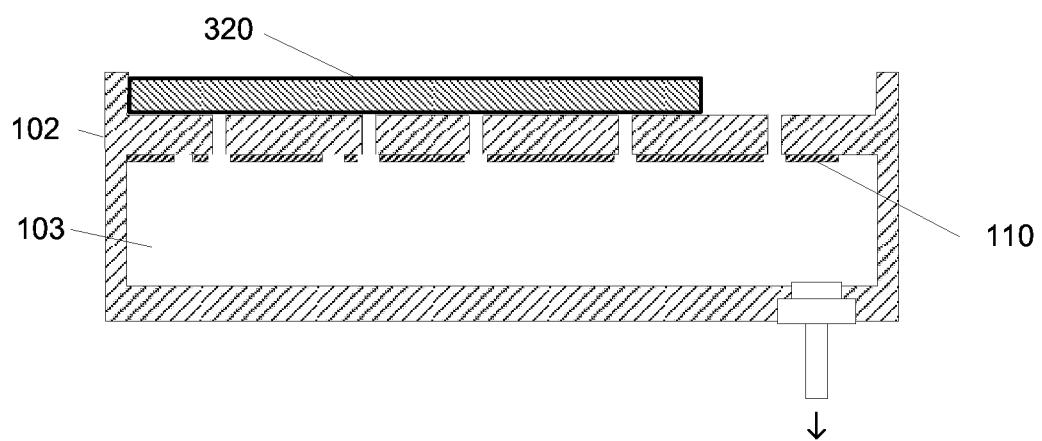
FIG. 14 is a sectional illustration of a planar workpiece retained on a vacuum hold-down apparatus of an exemplary embodiment including a vacuum table mask disposed inside the plenum of the vacuum hold-down table.

It is appreciated that the mask may be associated with the vacuum hold-down table in various ways. FIGS. 1-6 show the mask located over the vacuum hold-down table. Alternatively, the mask could be located inside the plenum of the vacuum hold-down table, as shown in FIG. 14.

In FIGS. 1-6 a regular pattern of vacuum orifices is shown and various arrays of apertures are provided on the mask. Alternatively, a regular pattern of apertures may be provided on the mask and various arrays of vacuum orifices may be provided in the vacuum hold-down table, as shown in FIG. 2A.

In the above description, the mask is positioned in first, second, third and fourth locations by selectable displacement of the mask in a plane. Alternatively, the mask may be flipped and/or rotated in various directions in order to shift between the various locations.

Reference is now made to FIGS. 7-13B, which are simplified pictorial illustrations of an inspection system employing vacuum hold-down apparatus constructed and operative in accordance with an embodiment of the present invention.

As seen in FIG. 7, there is provided an inspection system 500, such as an optical inspection system, for example an Orbotech Discovery™ 8000 AOI System, commercially available from Orbotech Ltd., of Yavne, Israel. Inspection system 500 includes a topless vacuum hold-down table 502 having an array of support structures 504, arranged on a surface 506 thereof and which is operative to support a selectably positionable mask 510. Workpieces, such as a planar workpiece 512 are retained on mask 510 during optical inspection thereof.

In accordance with a preferred embodiment of the present invention, the selectably positionable mask 510 has formed thereon a plurality of apertures 514. Optionally, the cross sectional configuration of the apertures 514 of the mask 510 may be different on opposite planar surfaces of the mask 510. For example, the area of the apertures may be relatively larger on the surface of the mask which faces the workpiece and relatively smaller on the surface of the mask which faces the vacuum hold-down table.

It is a particular feature of this embodiment of the present invention that the support structures 504 are configured and located such that depending on the position of the selectably positionable mask 510 relative thereto, selected apertures 514 are open and other apertures 514 are closed.

It is a further particular feature of this embodiment of the present invention that for each of a plurality of selectable positions of the selectable mask 510, the selected open apertures 514 are all mutually contiguous.

Figure 8:
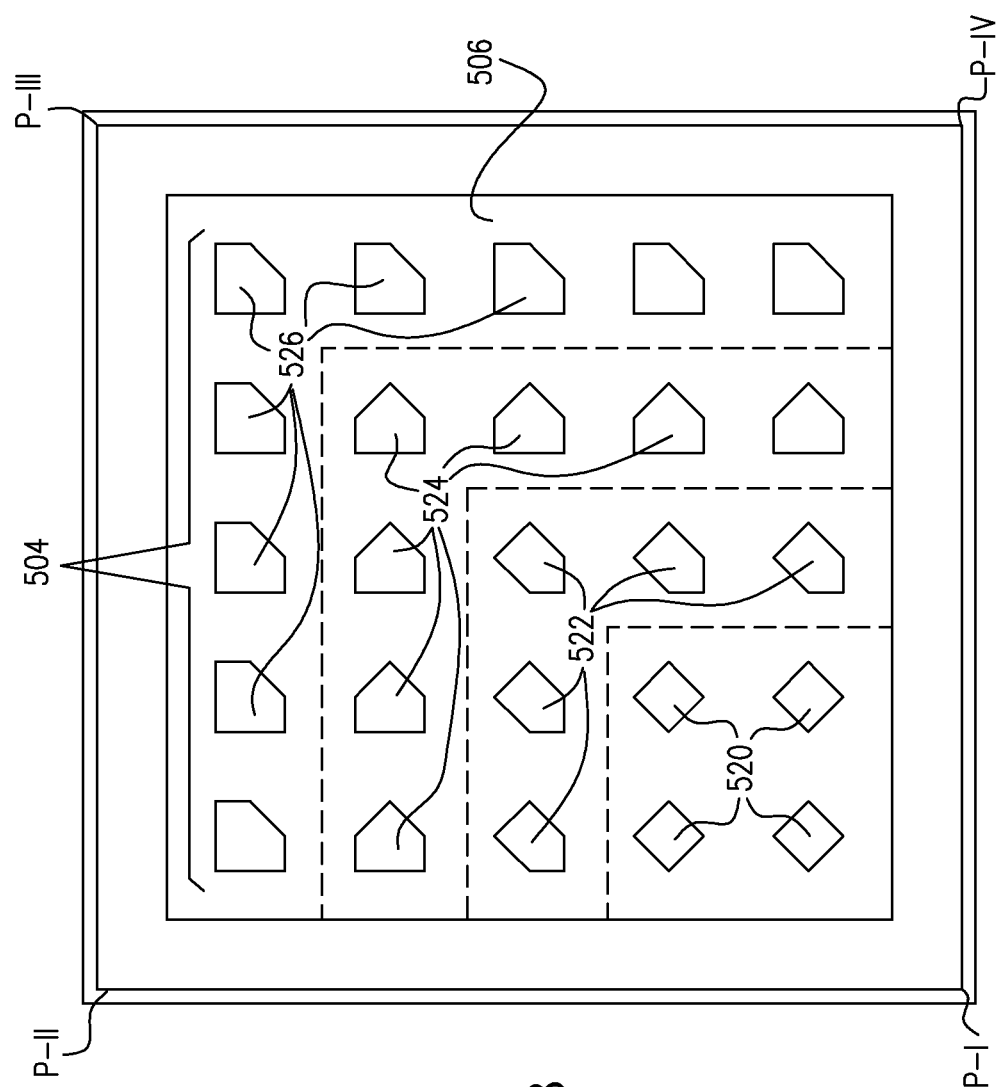
FIG. 8 is a simplified top view illustration of the vacuum hold-down apparatus of FIG. 7 without a vacuum table mask.

In a preferred embodiment of the invention, as seen with clarity in FIG. 8, the support structures 504 each define a cross sectional area in potential sealing engagement with an aperture 514 of mask 510. In a first plurality of the support structures 504, each here designated by reference numeral 520, the cross sectional area is a first area; in a second plurality of the support structures 504, each here designated by reference numeral 522, the cross sectional area is a second area, greater than the first area; in a third plurality of the support structures 504, each here designated by reference numeral 524, the cross sectional area is a third area greater than the second area; and in a fourth plurality of the support structures 504, each here designated by reference numeral 526, the cross sectional area is a fourth area, greater than the third area.

Figure 9:
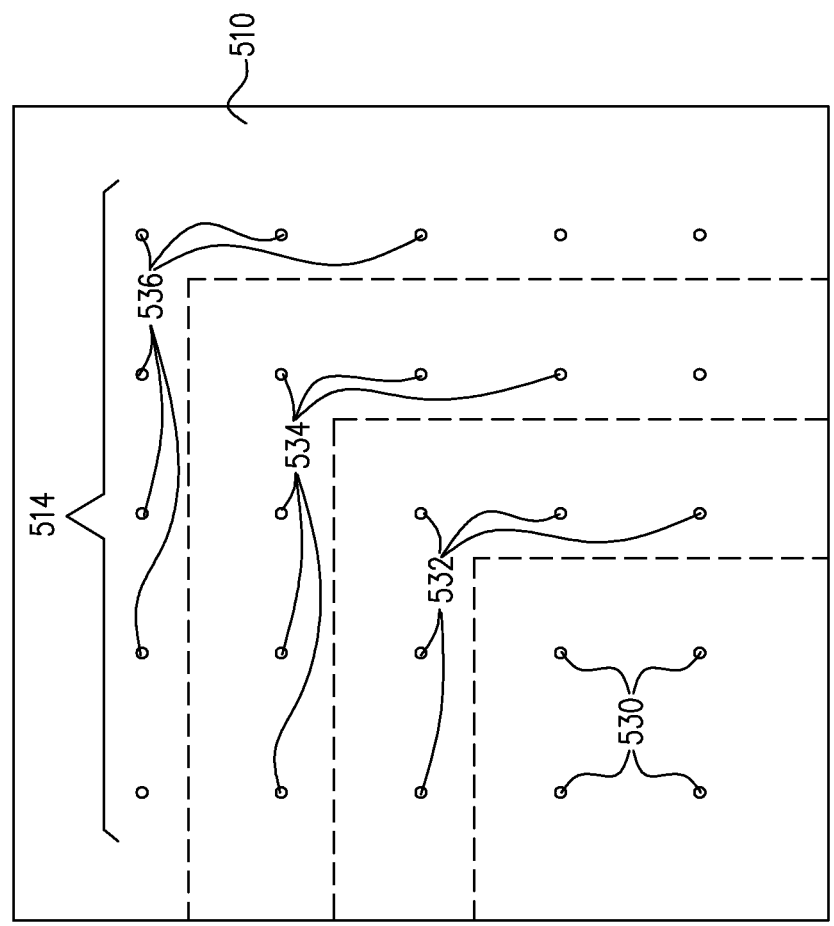
FIG. 9 is a simplified top view illustration of a vacuum table mask of the vacuum hold-down apparatus of FIG. 7.

In a preferred embodiment of the invention, as seen with clarity in FIG. 9, mask 510 includes different arrays of apertures 514 to allow different size workpieces to be in potential sealing arrangement with mask 510 and with vacuum hold-down table 502. In the illustrated embodiment, four different arrays of apertures 514 are shown, including a first array of apertures 514, each here designated by reference numeral 530, corresponding to a first workpiece size; a second array of apertures 514, each here designated by reference numeral 532, where the combination of the first and second arrays of apertures 530 and 532 correspond to a second workpiece size, greater than the first workpiece size; a third array of apertures 514, each here designated by reference numeral 534, where the combination of the first, second and third apertures 530, 532 and 534 correspond to a third workpiece size, greater than the second workpiece size; and a fourth array of apertures 514, each here designated by reference numeral 536, where the combination of the first, second, third and fourth apertures 530, 532, 534 and 536 correspond to a fourth workpiece size, greater than the third workpiece size.

Figures 13A, 13B:
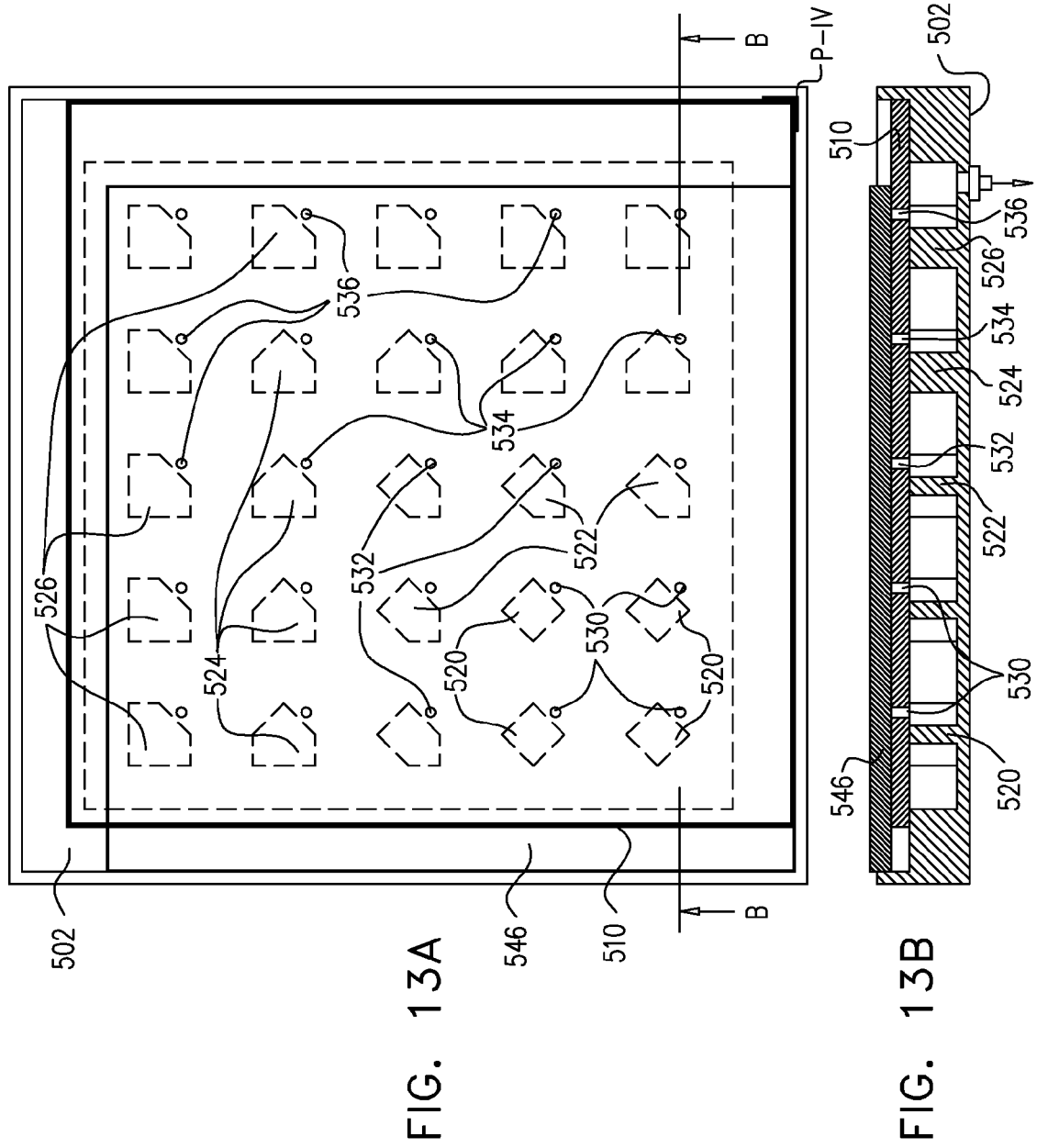
FIGS. 13A and 13B are respective plan and sectional illustrations of a fourth planar workpiece of a fourth size retained on the vacuum hold-down apparatus of FIGS. 7-9 in a fourth mutual registration arrangement, FIG. 13B being taken along the lines B-B in FIG. 13A.

It is a particular feature of the operation of this embodiment of the present invention that:

as seen in FIGS. 10A & 10B, when it is sought to inspect a workpiece 540 of a first size, the mask 510 is placed at a first location relative to topless vacuum hold-down table 502 such that the apertures 530 of the first array of apertures, are not blocked by support structures 520, and all of the apertures 530 of the first array of apertures underlie the workpiece 540 of a first size, and the remaining apertures 514 of mask 510 are blocked by support structures 504, such that free flow of air therethrough is prevented;

as seen in FIGS. 11A & 11B, when it is sought to inspect a workpiece 542 of a second size, the mask 510 is placed at a second location relative to topless vacuum hold-down table 502, different from the first location, such that the apertures 532 of the second array of apertures, are not blocked by support structures 522 and the apertures 530 of the first array of apertures are not blocked by support structures 520 and all of the apertures 530 and 532 of the first and second arrays of apertures underlie the workpiece 542 of a second size, and the remaining apertures 514 of mask 510 are blocked by support structures 504, such that free flow of air therethrough is prevented;

as seen in FIGS. 12A & 12B, when it is sought to inspect a workpiece 544 of a third size, the mask 510 is placed at a third location relative to topless vacuum hold-down table 502, different from the first and second locations, such that the apertures 534 of the third array of apertures, are not blocked by support structures 524, the apertures 530 of the first array of apertures are not blocked by support structures 520 and the apertures 532 of the second array of apertures are not blocked by support structures 522 and all of the apertures 530, 532 and 534 of the first, second and third arrays of apertures underlie the workpiece 544 of a third size, and the remaining apertures 514 of mask 510 are blocked by support structures 504, such that free flow of air therethrough is prevented; and as seen in FIGS. 13A & 13B, when it is sought to inspect a workpiece 546 of a fourth size, the mask 510 is placed at a fourth location relative to topless vacuum hold-down table 502, different from the first, second and third locations, such that the apertures 536 of the fourth array of apertures, are not blocked by support structures 526, the apertures 530 of the first array of apertures are not blocked by support structures 520, the apertures 532 of the second array of apertures are not blocked by support structures 522 and the apertures 534 of the third array of apertures are not blocked by support structures 524 and all of the apertures 530, 532, 534 and 536 of the first, second, third and fourth arrays of apertures underlie the workpiece 546 of a fourth size;

Enlargement A of FIG. 7 shows an embodiment wherein mask 510 includes a single uniformly spaced array of apertures 514 and the mask is positionable at four selectable locations relative to topless vacuum hold-down table 502. In the illustrated embodiment of FIG. 7, the topless vacuum hold-down table 502 includes four arrays of support structures 504, designated by reference numerals 520, 522, 524 and 526, as clearly shown in FIG. 8. The four selectable locations are defined by the four corners of peripheral walls 550 of topless hold-down table 502, which corners are designated as mask placement designators P-I, P-II, P-III and P-IV. By positioning a given corner of the mask 510 in engagement with a given corner designated as mask placement designator P-I, P-II, P-III or P-IV, the selected ones of apertures 514 of mask 510 are placed so as not to be blocked by support structures 504 of topless vacuum hold-down table 502.

In FIGS. 10A & 10B, which are respective plan and sectional illustrations of first planar workpiece 540 of a first size retained on the vacuum hold-down apparatus of the present invention in a first mutual registration arrangement, the mask 510 is positioned on the topless vacuum hold-down table 502 at a first position defined by corner engagement of mask 510 with mask placement designator P-I, such that only apertures 530 of the first array of apertures 514 are exposed to vacuum. The remaining apertures 514 are blocked by support structures 504.

In FIGS. 11A & 11B, which are respective plan and sectional illustrations of second planar workpiece 542 of a second size retained on the vacuum hold-down apparatus of the present invention in a second mutual registration arrangement, the mask 510 is positioned on the topless vacuum hold-down table 502 at a second position defined by corner engagement of mask 510 with mask placement designator P-II such that only apertures 530 and 532 of the first and second arrays of apertures 514 are exposed to vacuum. The remaining apertures 514 are blocked by support structures 504.

In FIGS. 12A & 12B, which are respective plan and sectional illustrations of third planar workpiece 544 of a third size retained on the vacuum hold-down apparatus of the present invention in a third mutual registration arrangement, the mask 510 is positioned on the topless vacuum hold-down table 502 at a third position defined by corner engagement of mask 510 with mask placement designator P-III, such that only apertures 530, 532 and 534 of the first, second and third arrays of apertures 514 are exposed to vacuum. The remaining apertures 514 are blocked by support structures 504.

In FIGS. 13A & 13B, which are respective plan and sectional illustrations of fourth planar workpiece 546 of a fourth size retained on the vacuum hold-down apparatus of the present invention in a fourth mutual registration arrangement, the mask 510 is positioned on the topless vacuum hold-down table 502 at a fourth position defined by corner engagement of mask 510 with mask placement designator P-IV, such that apertures 530, 532, 534 and 536 of the first, second, third and fourth arrays of apertures 514 are exposed to vacuum.

It is appreciated that any suitable number of differently sized workpieces may be accommodated by suitable configuration and arrangement of the support structures 504. It is further appreciated that the support structures 504 may be constructed in any suitable manner and configuration to selectably block apertures in a mask. The support structures 504 need not be fixed to the remainder of the topless vacuum hold-down table 502 and may be removably mounted with respect thereto.

It will be appreciated by persons skilled in the art that the present invention is not limited by what has been particularly shown and described hereinabove. Rather the present invention includes both combinations and subcombinations of various features described herein and improvements and variations which would occur to persons skilled in the art upon reading the foregoing description and which are not in the prior art.

The invention claimed is:

1. A vacuum hold-down system for use with workpieces of various shapes and/or sizes, the system comprising:
 a vacuum hold-down table defining a mask support plane; and
 an apertured vacuum table mask which is selectably positionable on said mask support plane,
 said vacuum hold-down table and said vacuum table mask being configured to define a plurality of selectable different contiguous arrays of vacuum apertures, by suitable relative positioning of said vacuum table mask and said vacuum hold-down table in said mask support plane.

2. The vacuum hold-down system according to claim 1 and wherein:
 said vacuum hold-down table has an array of vacuum orifices arranged on a support surface thereof; and
 said vacuum table mask has formed thereon at least two arrays of apertures, mutually offset from each other, each of said at least two arrays of apertures being registrable with at least some vacuum orifices of said array of vacuum orifices, each aperture of each of said at least two arrays of apertures being configured to underlie at least one of said workpieces.

3. The vacuum hold-down system according to claim 1 and wherein:

said vacuum table mask has an array of apertures arranged on a support surface thereof, said mask being configured to underlie at least one of said workpieces; and said vacuum hold-down table has formed thereon at least two arrays of vacuum orifices, mutually offset from each other, at least some of said apertures of said mask being registrable with orifices of each of said at least two arrays of orifices.

4. The vacuum hold-down system according to claim 2 wherein the cross-sectional size of each aperture is at least slightly larger than the cross-sectional size of each vacuum orifice.

5. The vacuum hold-down system according to claim 3 wherein the cross-sectional size of each aperture is at least slightly larger than the cross-sectional size of each vacuum orifice.

6. The vacuum hold-down system according to claim 2 wherein said vacuum table mask is positionable at at least two selectable locations relative to said vacuum hold-down table.

7. The vacuum hold-down system according to claim 3 wherein said vacuum table mask is positionable at at least two selectable locations relative to said vacuum hold-down table.

8. The vacuum hold-down system according to claim 2 and wherein said vacuum table mask includes four arrays of apertures.

9. The vacuum hold-down system according to claim 3 and wherein said vacuum table mask includes four arrays of apertures.

10. The vacuum hold-down system according to claim 8 and wherein said vacuum table mask is positionable at four selectable locations relative to said vacuum hold-down table.

11. The vacuum hold-down system according to claim 9 and wherein said vacuum table mask is positionable at four selectable locations relative to said vacuum hold-down table.

12. The vacuum hold-down system according to claim 10 and wherein said four selectable locations are defined by corners of said vacuum hold-down table.

13. The vacuum hold-down system according to claim 11 and wherein said four selectable locations are defined by corners of said vacuum hold-down table.

14. The vacuum hold-down system according to claim 2 and wherein said vacuum table mask is located over the vacuum hold-down table.

15. The vacuum hold-down system according to claim 3 and wherein said vacuum table mask is located over the vacuum hold-down table.

16. The vacuum hold-down system according to claim 2 and wherein said vacuum table mask is located inside a plenum of the vacuum hold-down table.

17. The vacuum hold-down system according to claim 3 and wherein said vacuum table mask is located inside a plenum of the vacuum hold-down table.

18. The vacuum hold-down system according to claim 2 and wherein areas of said at least two arrays are at least partially overlapping.

19. The vacuum hold-down system according to claim 3 and wherein areas of said at least two arrays are at least partially overlapping.

20. The vacuum hold-down system according to claim 1 and wherein:
said vacuum hold-down table has an array of support surfaces arranged thereon; and
said vacuum table mask has formed thereon an array of apertures.

21. The vacuum hold-down system according to claim 1 and wherein:
said vacuum table mask has an array of apertures, said mask being configured to underlie at least one of said workpieces; and
said vacuum hold-down table has formed thereon at least two arrays of support surfaces, said support surfaces of different arrays of said at least two arrays having a different cross sectional configuration, said support surfaces of each array of said at least two arrays having the same cross sectional configuration, said apertures of said mask being configured so as not to overlie said support surfaces of at least one of said at least two arrays of support surfaces.

22. The vacuum hold-down system according to claim 1 wherein said vacuum table mask is positionable at at least two selectable locations relative to said vacuum hold-down table.

23. The vacuum hold-down system according to claim 1 and wherein said vacuum table mask includes four arrays of apertures.

24. The vacuum hold-down system according to claim 23 and wherein said vacuum table mask is positionable at four selectable locations relative to said vacuum hold-down table.

25. The vacuum hold-down system according to claim 24 and wherein said four selectable locations are defined by corners of said vacuum hold-down table.

26. The vacuum hold-down system according to claim 20 and wherein said vacuum table mask is located over said support surfaces.

27. A vacuum table mask for use with a vacuum hold-down table having an array of vacuum orifices arranged on a support surface thereof and workpieces of various shapes and/or sizes, said mask comprising:
a substrate having formed thereon at least two arrays of apertures, mutually offset from each other, each of said at least two arrays of apertures being registrable with at least some vacuum orifices of said array of vacuum orifices, and
wherein areas of said at least two arrays are at least partially overlapping.

28. The vacuum table mask according to claim 27 and wherein the cross-sectional size of each aperture of said at least two arrays of apertures is at least slightly larger than the cross-sectional size of each vacuum orifice of said array of vacuum orifices.

29. The vacuum table mask according to claim 27 and wherein said vacuum table mask includes four arrays of apertures.

30. A method for providing vacuum hold-down of workpieces of various shapes and/or sizes onto a vacuum hold-down table having an array of vacuum orifices arranged on a support surface thereof, the method comprising:
placing onto said support surface of said vacuum hold-down table, a vacuum table mask having formed thereon at least two arrays of apertures, mutually offset from each other, each of said at least two arrays of apertures being registrable with at least some vacuum orifices of said array of vacuum orifices, each of said at least two arrays of apertures being configured to underlie one of said workpieces;
positioning said mask on said support surface such that one of said at least two arrays of apertures is in registration with at least some vacuum orifices of said array of vacuum orifices;
placing a workpiece of a first size/shape of said workpieces of various shapes and/or sizes onto said vacuum hold-down table, overlying at least part of said mask and overlying said one of said at least two arrays of apertures which is in registration with at least some vacuum orifices of said array of vacuum orifices;

removing said workpiece of a first size/shape from said vacuum hold-down table;

repositioning said mask on said support surface such that another one of said at least two arrays of apertures is in registration with at least some vacuum orifices of said array of vacuum orifices; and placing one of said workpieces of a second size/shape onto said vacuum hold-down table, overlying at least part of said mask and overlying said another one of said at least two arrays of apertures which is in registration with at least some vacuum orifices of said array of vacuum orifices;

wherein areas of said at least two arrays are at least partially overlapping.

* * * * *